US010221934B2

(12) United States Patent
Asano et al.

(10) Patent No.: US 10,221,934 B2
(45) Date of Patent: Mar. 5, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Takashi Asano, Miyoshi (JP); Tatsuhiro Terada, Toyota (JP); Kazuhiro Mori, Toyota (JP); Hiroaki Muramatsu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 15/489,002

(22) Filed: Apr. 17, 2017

(65) Prior Publication Data
US 2017/0299042 A1    Oct. 19, 2017

(30) Foreign Application Priority Data

Apr. 19, 2016  (JP) .................. 2016-083872

(51) Int. Cl.
| | |
|---|---|
| *F16H 57/025* | (2012.01) |
| *F01L 1/047* | (2006.01) |
| *F02F 1/24* | (2006.01) |
| *F02F 7/00* | (2006.01) |
| *F02F 11/00* | (2006.01) |
| *F16H 57/029* | (2012.01) |
| *F16H 57/03* | (2012.01) |

(Continued)

(52) U.S. Cl.
CPC ............ *F16H 57/025* (2013.01); *F01L 1/022* (2013.01); *F01L 1/047* (2013.01); *F02F 1/24* (2013.01); *F02F 7/0043* (2013.01); *F02F 7/0073* (2013.01); *F02F 11/002* (2013.01); *F16H 57/029* (2013.01); *F16H 57/03* (2013.01); *F16H 57/035* (2013.01); *F01L 1/024* (2013.01); *F01L 2001/028* (2013.01); *F01L 2001/0537* (2013.01); *F01L 2101/00* (2013.01); *F01L 2810/03* (2013.01); *F01L 2810/04* (2013.01); *F02F 2007/0078* (2013.01)

(58) Field of Classification Search
CPC ...... F16H 57/025; F16H 57/029; F16H 57/03; F16H 57/035; F01L 1/047; F02F 1/24; F02F 7/0043; F02F 11/002
USPC .......................................... 123/195 R, 198 E
See application file for complete search history.

(56) References Cited

U.S. PATENT DOCUMENTS

| | | | | |
|---|---|---|---|---|
| 6,308,679 B1 * | 10/2001 | Nakamura | ................ | F01L 1/02 |
| | | | | 123/195 C |
| 6,691,656 B1 * | 2/2004 | Pierik | ..................... | F01L 1/022 |
| | | | | 123/90.17 |

(Continued)

FOREIGN PATENT DOCUMENTS

| | | |
|---|---|---|
| JP | S53-145013 U | 11/1978 |
| JP | H03-063728 U | 6/1991 |

(Continued)

*Primary Examiner* — Syed O Hasan
(74) *Attorney, Agent, or Firm* — Oliff PLC

(57) ABSTRACT

A case that houses a chain includes a first cover member fixed to a cylinder block and a cylinder head, and a second cover member arranged on the opposite side of the cylinder block and the cylinder head from the first cover member. In an intermediate part, which is a part of a confronting wall of the first cover member between the first flange and the second flange, a cover-side rib is provided, having a height so that a distal end of the cover-side rib is not in contact with the cylinder block.

7 Claims, 4 Drawing Sheets

(51) Int. Cl.
*F16H 57/035* (2012.01)
*F01L 1/02* (2006.01)
F01L 1/053 (2006.01)

(56) References Cited

U.S. PATENT DOCUMENTS

| | | | | |
|---|---|---|---|---|
| 8,584,646 | B2* | 11/2013 | Takeuchi | F01L 1/02 123/195 C |
| 2009/0194062 | A1* | 8/2009 | Iwata | F01M 11/02 123/196 R |
| 2010/0192902 | A1* | 8/2010 | Koyama | F02B 77/13 123/198 E |
| 2013/0133611 | A1* | 5/2013 | Koiwa | F02B 77/00 123/195 C |

FOREIGN PATENT DOCUMENTS

| | | |
|---|---|---|
| JP | 2002-054454 A | 2/2002 |
| JP | 2007-113411 A | 5/2007 |
| JP | 2008-157298 A | 7/2008 |
| JP | 2008-286207 A | 11/2008 |
| JP | 2011-012741 A | 1/2011 |
| JP | 2016-011707 A | 1/2016 |

\* cited by examiner

INTERNAL COMBUSTION ENGINE

INCORPORATION BY REFERENCE

The disclosure of Japanese Patent Application No. 2016-083872 filed on Apr. 19, 2016 including the specification, drawings and abstract is incorporated herein by reference in its entirety.

BACKGROUND

1. Technical Field

The disclosure relates to an internal combustion engine, in which an endless transmission member transmitting rotation of a crankshaft to a camshaft is provided in a space defined by a case attached to a cylinder block and a cylinder head.

2. Description of Related Art

As this type of internal combustion engine, an internal combustion engine described in Japanese Patent Application Publication No. 2016-11707 (JP 2016-11707 A) is proposed. In this internal combustion engine, a case is made of a first cover member, which is fixed to a cylinder block and a cylinder head, and a second cover member, which is arranged on the opposite side of the cylinder block and the cylinder head from the first cover member. Then, an endless transmission member, which transmits rotation of a crankshaft to a camshaft, is provided in a space defined by the case.

In such an internal combustion engine, there are instances where the two cover members are fixed to the cylinder block and the cylinder head by tightening bolts. In this case, the first cover member is sandwiched between the cylinder block and the cylinder head, and the second cover member.

FIG. 7 is an example of a first cover member 100. As shown in FIG. 7, in the first cover member 100, an insertion hole 101 and a cutout 102 are provided. A crankshaft 200 is inserted in the insertion hole 101, and the cutout 102 is provided so as to avoid contact with camshafts 201, 202. Then, in a confronting wall 103 of the first cover member 100, which forms a surface that faces a cylinder block and a cylinder head, a circular first flange 104 is provided so as to surround the crankshaft 200 inserted into the insertion hole 101. A distal end of the first flange 104 is pressed against the cylinder block side. Thus, it becomes possible to seal a space between the cylinder block and the first cover member 100.

Further, in the confronting wall 103, a second flange 105 is provided at a position away from the first flange 104 on the cutout 102 side, and the second flange 105 partially extends along an edge of the cutout 102 and surrounds the camshafts 201, 202. A distal end of the second flange 105 is pressed against the cylinder head side. Thus, it becomes possible to seal a space between the cylinder head and the second flange 105.

As shown in FIG. 7, since the first flange 104 and the second flange 105 are separated from each other, an intermediate part 103M of the confronting wall 103 of the first cover member 100, which is a part positioned between the first flange 104 and the second flange 105, does not have a part that is in contact with the cylinder block and the cylinder head. Therefore, in the first cover member 100, the intermediate part 103M is a part having lower rigidity than those of a peripheral part of the first flange 104 and a peripheral part of the second flange 105.

Incidentally, there are some instances where the cylinder head and the cylinder block expand thermally due to generation of heat in the internal combustion engine, and the cylinder head and the cylinder block contract as the internal combustion engine is cooled as the engine is stopped. In such a case, when deformation of the cylinder block and deformation of the cylinder head are different from each other, an end surface of the cylinder block on the first cover member 100 side, and an end surface of the cylinder head on the first cover member 100 side may be misaligned.

As a case that accommodates an endless transmission member, for example, there is a known case having a single cover member as described in Japanese Patent Application Publication No. 2007-113411 (JP 2007-113411 A). In this instance, a space that accommodates the endless transmission member is defined by a cylinder block, a cylinder head, and the cover member. In such a cover member, a single flange is provided along a circumference of the cover member. Then, a distal end of a part of the flange facing the cylinder block is pressed against the cylinder block, and a distal end of a part of the flange facing the cylinder head is pressed against the cylinder head. Therefore, in a part where the cylinder head and the cylinder block are adjacent to each other, when an end surface of the cylinder head and an end surface of the cylinder block, which are in contact with the flange of the cover member, are misaligned, it is inevitable that a gap is formed between either one of the foregoing end surfaces and the flange of the cover member. Thus, sealing between the cylinder head and the cylinder block, and the flange may be deteriorated.

On the contrary, in the first cover member 100, in which the first flange 104 and the second flange 105 are separated from one another as shown in FIG. 7, even when the foregoing end surfaces are misaligned, the first flange 104 and the second flange 105 easily follow movements of the end surfaces because the intermediate part 103M is deformed. Therefore, it is possible to restrain the flanges 104, 105 from being separated from the end surfaces, thereby ensuring sealing.

SUMMARY

When an engine is operated, there are instances where vibration generated due to the engine operation is transmitted to the first cover member 100 through the first flange 104 and the second flange 105. In the first cover member 100, in which sealing is ensured by separating the first flange 104 and the second flange 105 from one another as described above, rigidity of the intermediate part 103M is lower than those of the peripheral part of the first flange 104 and the peripheral part of the second flange 105. Therefore, when such a vibration is transmitted to the first cover member 100, the intermediate part 103M having lower rigidity in the first cover member 100 vibrates, and this may cause noise.

An object of the disclosure is to provide an internal combustion engine that is able to restrain vibration of an intermediate part of a first cover member in which a first flange for sealing a cylinder block side and a second flange for sealing a cylinder head side are separated from each other.

An internal combustion engine according to an aspect of the disclosure includes a first cover member fixed to a cylinder block and a cylinder head, and a second cover member arranged on the opposite side of the cylinder block and the cylinder head from the first cover member. The first cover member and the second cover member define a space, and an endless transmission member transmitting rotation of a crankshaft to a camshaft is provided in the space. In a confronting wall of the first cover member, which structures a surface facing the cylinder block and the cylinder head, a first flange and a second flange are provided so as to be separated from each other. The first flange projects to the cylinder block side, and a distal end of the first flange is pressed against the cylinder block. The second flange projects to the cylinder head side, and a distal end of the second flange is pressed against the cylinder head. In the internal combustion engine, a rib is provided in an intermediate part, which is a part of the confronting wall of the first cover member between the first flange and the second flange. The rib projects towards the cylinder block and has a height so that a distal end of the rib is not in contact with the cylinder block.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
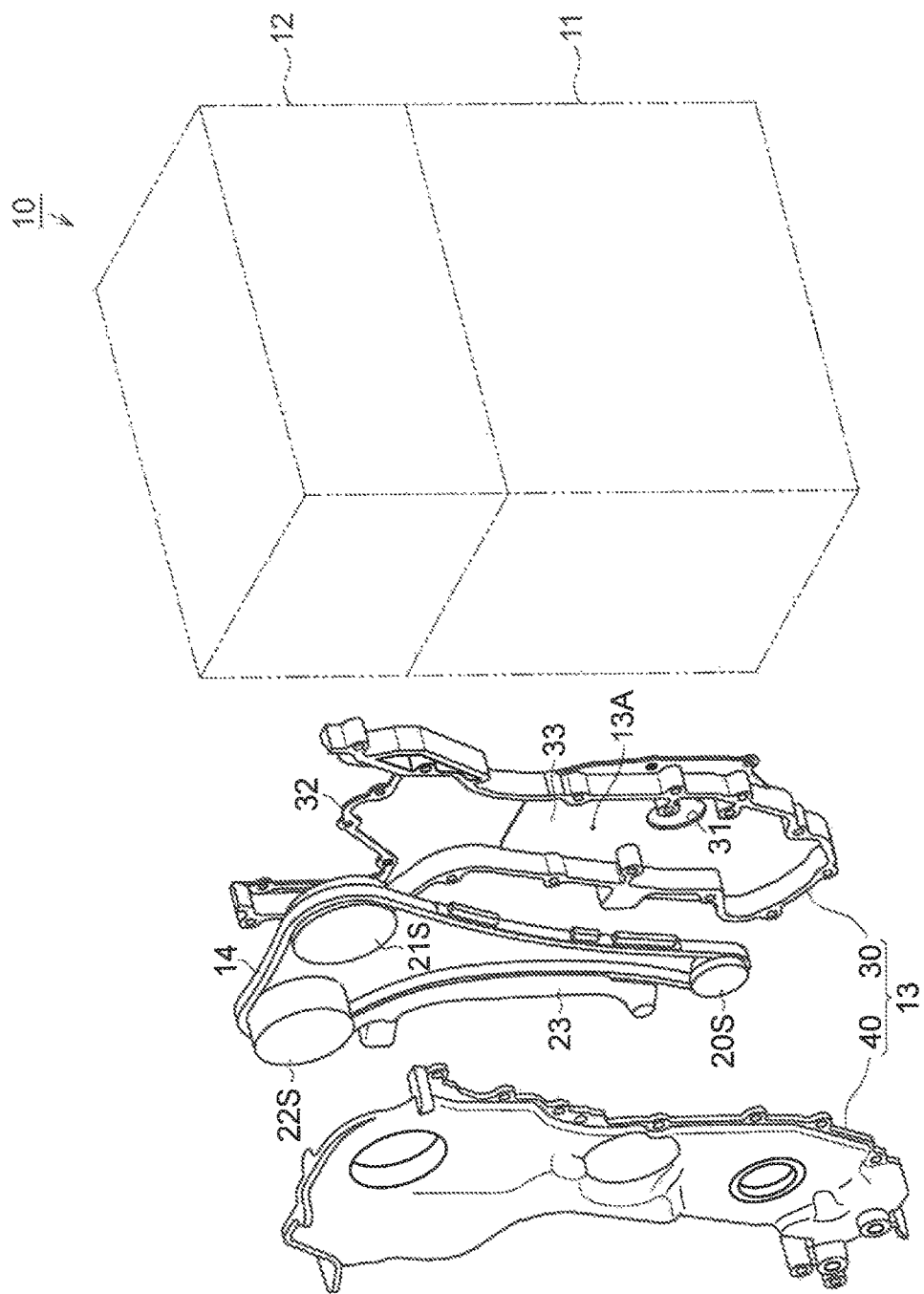
FIG. 1 is an exploded perspective view of a case in which a chain is housed according to an embodiment of an internal combustion engine.

An embodiment of an internal combustion engine is explained with reference to FIG. 1 to FIG. 6. As shown in FIG. 1, an internal combustion engine 10 is provided with a case 13 that is attached to a cylinder block 11 and a cylinder head 12 by fastening bolts. The case 13 includes a first cover member 30, which is fixed to the cylinder block 11 and the cylinder head 12, and a second cover member 40, which is arranged on the opposite side the cylinder block 11 and the cylinder head 12 from the first cover member 30. Then, the first cover member 30 and the second cover member 40 define a housing space 13A, and a chain 14 that is an example of an endless transmission member is provided in the housing space 13A.

Figure 2:
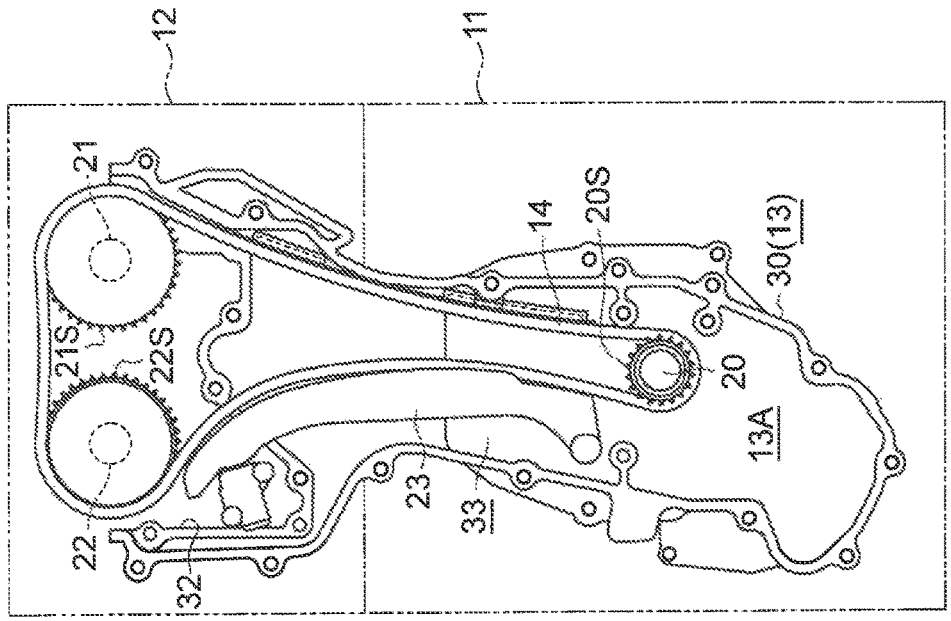
FIG. 2 is a plan view of how the chain is housed in a housing space defined inside the case in the internal combustion engine.

As shown in FIG. 1 and FIG. 2, a sprocket 20S provided in a crankshaft 20, and sprockets 21S, 22S provided in camshafts 21, 22 are arranged in the housing space 13A. The chain 14 is wound around the sprocket 20S to 22S. Thus, rotation of the crankshaft 20 is transmitted to the camshafts 21, 22 through the chain 14. A chain tensioner 23 adjusts tension of the chain 14.

Figure 3:
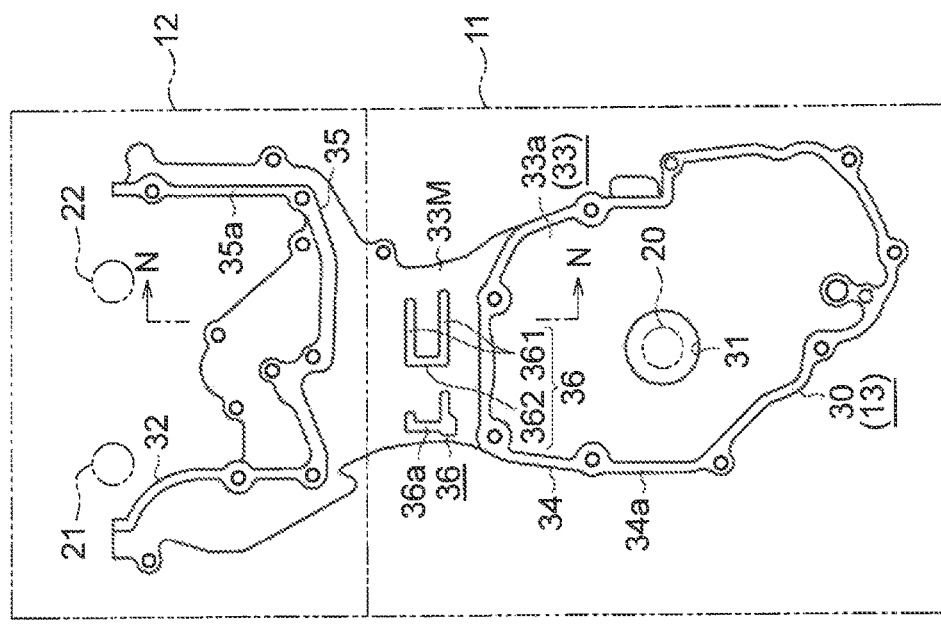
FIG. 3 is a plan view of a first cover member of the internal combustion engine, seen from a side of a cylinder block and a cylinder head.

As shown in FIG. 3, the first cover member 30 is provided with an insertion hole 31 and a cutout 32. The crankshaft 20 is inserted in the insertion hole 31, and the cutout 32 is provided so as to avoid contact with the camshafts 21, 22. In a confronting wall 33 of the first cover member 30, which forms a surface 33a facing the cylinder block 11 and the cylinder head 12, a circular first flange 34 is provided, which projects on the cylinder block 11 side and surrounds the crankshaft 20. A distal end 34a of the first flange 34 is pressed against the cylinder block 11. Liquid gasket is provided between the distal end 34a of the first flange 34 and the cylinder block 11. Thus, sealing between the cylinder block 11 and the first cover member 30 is ensured.

Further, in the confronting wall 33, a second flange 35 is provided at a position away from the first flange 34 towards the cutout 32. The second flange 35 projects on the cylinder head 12 side and surrounds the camshafts 21, 22. A distal end 35a of the second flange 35 is pressed against the cylinder head 12. Liquid gasket is provided between the distal end 35a of the second flange 35 and the cylinder head 12. Thus, sealing between the cylinder head 12 and the second cover member 40 is ensured.

Also, as shown in FIG. 3, in a part of the confronting wall 33 between the first flange 34 and the second flange 35, a part that faces the cylinder block 11 is defined as an intermediate part 33M, and a cover-side rib 36, which projects on the cylinder block 11 side, is provided in the intermediate part 33M. In this embodiment, the cover-side rib 36 includes a first rib 361 extending in a direction in which the camshafts 21, 22 are arrayed (the horizontal direction in the drawing), and a second rib 362 extending in a direction in which a piston reciprocates (the vertical direction in the drawing). Thus, the cover-side rib 36 has a structure in which the ribs 361, 362 having different longitudinal directions are connected with one another.

Figure 4:
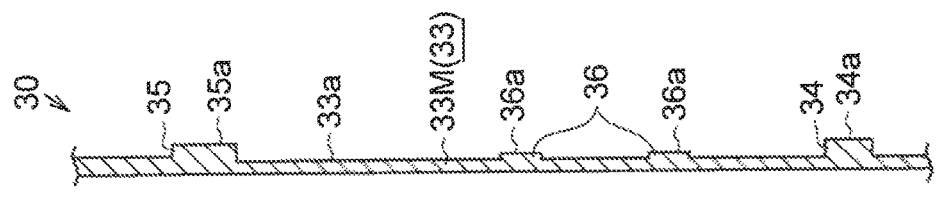
FIG. 4 is a sectional view taken along the arrows IV-IV in FIG. 3.
Figure 5:
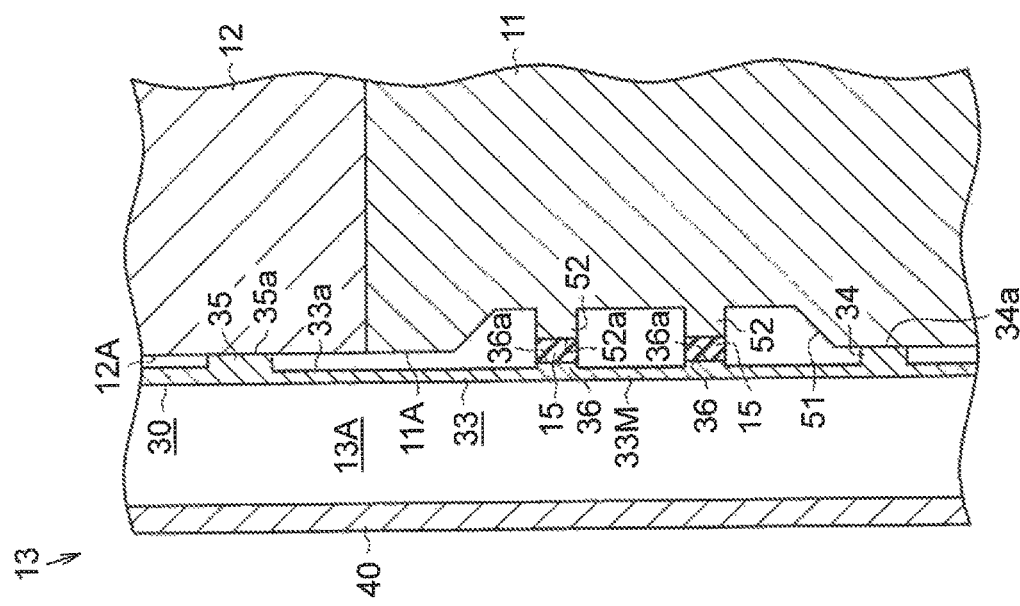
FIG. 5 is a sectional view of how the first cover member is attached to the cylinder block and the cylinder head in the internal combustion engine.

As shown in FIG. 4, in a direction in which the crankshaft 20 extends (the horizontal direction in the drawing), when dimensions of the flanges 34, 35 and the cover-side rib 36 are defined as heights of the flanges 34, 35 and the cover-side rib 36, the height of the cover-side rib 36 is smaller than that of the each of the flanges 34, 35. As shown in FIG. 5, a distal end 36a (the right end in the drawing) of the cover-side rib 36 is not in contact with the cylinder block 11. In FIG. 5, the chain 14 is not shown.

Further, as shown in FIG. 5, in a part of the cylinder block 11, which faces the intermediate part 33M of the first cover member 30, a depressed part 51 is provided. Then, from a bottom surface of the depressed part 51, a block-side rib 52 is projecting, and a distal end 52a of the block-side rib 52 faces the distal end 36a of the cover-side rib 36. In this embodiment, in the direction in which the crankshaft 20 extends (the horizontal direction in the drawing), the distal end 52a of the block-side rib 52 is at a position separated more from the chain 14 (the right side in the drawing) than parts of the cylinder block 11 and the cylinder head 12, which face the flanges 34, 35.

Then, as shown in FIG. 5, an elastic body 15, which expands and contracts in the direction in which the crankshaft 20 extends, is provided between the distal end 36a of the cover-side rib 36 and the distal end 52a of the block-side rib 52. In this embodiment, the elastic body 15 is made of liquid gasket. The elastic body 15 is in contact with the entire distal end 36a of the cover-side rib 36 and the entire distal end 52a of the block-side rib 52.

A thickness of the elastic body 15, which is a dimension of the elastic body 15 in the horizontal direction in FIG. 5, is larger than a thickness of the liquid gasket provided in the distal ends 34a, 35a of the flanges 34, 35. However, since the elastic body 15 is made of liquid gasket, it is difficult to make the elastic body 15 thick. Thus, in this embodiment, a space between the distal end 36a of the cover-side rib 36 and the distal end 52a of the block-side rib 52, in other words, the thickness of the elastic body 15, is adjusted by adjusting the height of the block-side rib 52.

Figure 6:
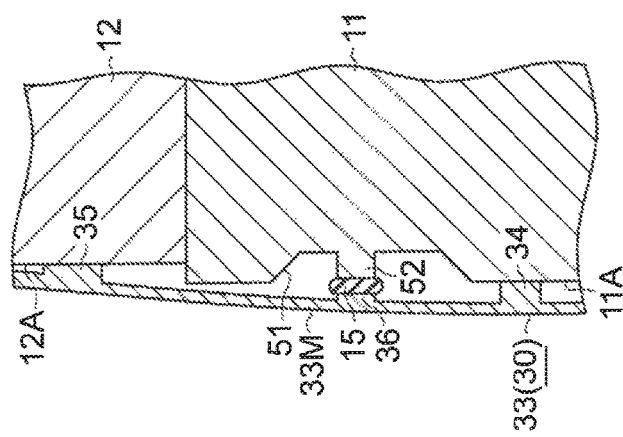
FIG. 6 is a view of an action when an end surface of the cylinder block on the first cover member side and an end surface of the cylinder head on the first cover member side are misaligned in the internal combustion engine.
Figure 7:
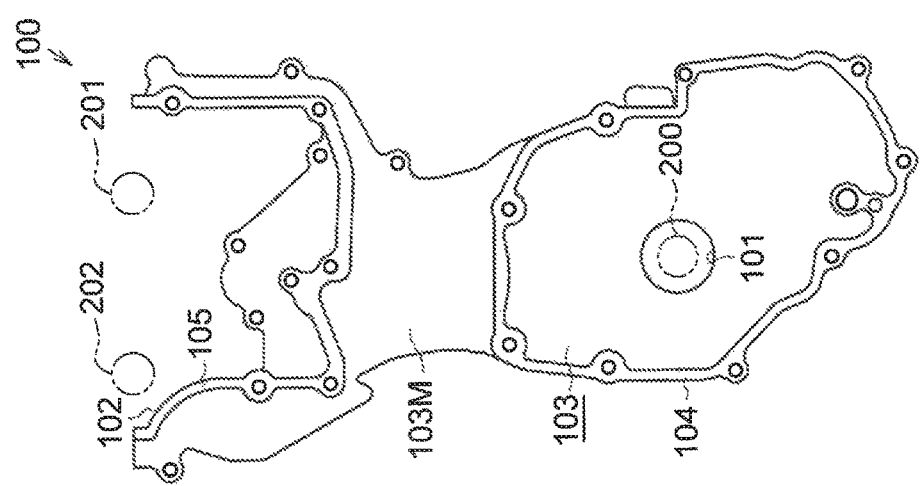
FIG. 7 is a plan view of a first cover member in a conventional internal combustion engine, seen from a side of a cylinder block and a cylinder head.

Next, with reference to FIG. 5 and FIG. 6, an action of the internal combustion engine 10 in this embodiment is explained together with its effects. A surface of the cylinder block 11 on the first cover member 30 side is referred to as an end surface 11A of the cylinder block 11, and a surface of the cylinder head 12 on the first cover member 30 side is referred to as an end surface 12A of the cylinder head 12. In FIG. 6, for the sake of understanding of the explanation, the shapes of the cylinder block 11, the first cover member 30 and so on are simplified.

While the engine is operating, vibration caused by the engine operation is transmitted from the cylinder block 11 and the cylinder head 12 side to the first cover member 30 through the flanges 34, 35. In this regard, in this embodiment, rigidity of the intermediate part 33M is increased by providing the cover-side rib 36 in the intermediate part 33M between the first flange 34 and the second flange 35. Thus, even when vibration is transmitted from the cylinder block 11 and the cylinder head 12 to the first cover member 30 through the flanges 34, 35, it is possible to restrain the intermediate part 33M from vibrating. This means that it is possible to enhance an effect of restraining generation of noise caused by vibration in the internal combustion engine 10.

In this embodiment, due to the elastic body 15 provided between the distal end 36a of the cover-side rib 36 of the first cover member 30 and the cylinder block 11, it becomes possible to attenuate vibration of the intermediate part 33M. Thus, it is possible to enhance an effect of restraining generation of noise caused by vibration of the intermediate part 33M.

In FIG. 5, in the direction in which the crankshaft 20 extends (the horizontal direction in the drawing), the end surface 11A of the cylinder block 11 and the end surface 12A of the cylinder head 12 are at the same position. It is assumed that, from this state, the end surface 12A of the cylinder head 12 is displaced to the first cover member 30 side (the left side in FIG. 5) relative to the end surface 11A of the cylinder block 11, and the end surface 11A of the cylinder block 11 and the end surface 12A of the cylinder head 12 are misaligned. When such a misalignment happens, the second flange 35 of the first cover member 30 is displaced, following the displacement of the end surface 12A of the cylinder head 12. In that case, the elastic body 15 positioned between the intermediate part 33M and the cylinder block 11 extends. In other words, as the first cover member 30 is deformed, following such a displacement, it is possible to shift the position of the first flange 34 and the position of the second flange 35 in the direction in which the crankshaft 20 extends. Therefore, it becomes possible to restrain deterioration of sealing between the first flange 34 and the cylinder block 11 and sealing between the second flange 35 and the cylinder head 12.

Next, as shown in FIG. 6, it is assumed that the end surface 12A of the cylinder head 12 is displaced to the opposite side (the right side in FIG. 6) of the first cover member 30 relative to the end surface 11A of the cylinder block 11, and the end surface 11A of the cylinder block 11 and the end surface 12A of the cylinder head 12 are misaligned. When such a misalignment happens, the first cover member 30 is deformed with fulcrum that is a part of the first cover member 30 in contact with the cylinder block 11, in other words, the distal end 34a of a part of the first flange 34 closer to the second flange 35 than the crankshaft 20. In this case, the elastic body 15, which is located between the intermediate part 33M of the first cover member 30 and the cylinder block 11, is compressed and deformed. Therefore, even when there is the elastic body 15 between the intermediate part 33M and the cylinder block 11, it is unlikely that the elastic body 15 inhibits the deformation of the intermediate part 33M in this case. Therefore, because the first cover member 30 is deformed along with such a misalignment, it is possible to shift the position of the first flange 34 and the position of the second flange 35 in the direction in which the crankshaft 20 extends. Hence, it is possible to restrain deterioration of sealing between the first flange 34 and the cylinder block 11 and sealing between the second flange 35 and the cylinder head 12.

In this embodiment, the following effects are obtained further. (1) In this embodiment, by adjusting the height of the block-side rib 52, it is possible to adequately adjust the space between the distal end 36a of the cover-side rib 36 and the cylinder block 11 without making the cover-side rib 36 too high, in other words, without making rigidity of the intermediate part 33M of the first cover member 30 too high. Therefore, it is possible to appropriately arrange the elastic body 15 made of liquid gasket appropriately between the distal end 36a of the cover-side rib 36 and the cylinder block 11.

(2) In the intermediate part 33M of the first cover member 30, the plurality of ribs 361, 362 having different longitudinal directions are connected with one another. Therefore, compared to a case where only one rib extending in one direction is provided in the intermediate part 33M, stress received by the ribs 361, 362 is dispersed into the other rib, thereby effectively restraining vibration of the intermediate part 33M. Further, compared to a case where the cover-side rib 36 has only one rib extending in one direction, it is possible to increase rigidity of the intermediate part 33M in a wider range.

(3) In a case where the cover-side rib 36 is provided in first cover member 30 so as to face the chain 14, it becomes necessary to expand a space between the confronting wall 33 and the chain 14 in order to avoid interference between the cover-side rib 36 and the chain 14, and the size of the case 13 having the first cover member 30 may have to be increased in the direction in which the crankshaft 20 extends. On the contrary, in this embodiment, the cover-side rib 36 is provided in the first cover member 30 so as to project towards the cylinder block 11. Further, even when the cover-side rib 36 is provided in the first cover member 30 in this fashion, it is not necessary to change the heights of the flanges 34, 35. Since there is no need to expand the space between the confronting wall 33 and the chain 14, it is possible to restrain an increase in size of the case 13 in the direction in which the crankshaft 20 extends.

The foregoing embodiment may be changed into different embodiments stated below.

The cover-side rib 36 of the intermediate part 33M of the first cover member 30 may not have a structure in which ribs having different longitudinal directions are connected with one another. For example, the cover-side rib 36 may be made of a plurality of disconnected ribs having different longitudinal directions. Further, the cover-side rib 36 may have one or a plurality of ribs extending in one direction.

If the distal end 36a of the cover-side rib 36 is not in contact with the cylinder block 11, when the end surface 11A of the cylinder block 11 and the end surface 12A of the cylinder head 12 are misaligned, it is unlikely that deformation of the intermediate part 33M is inhibited. Therefore, unless the distal end 36a of the cover-side rib 36 is in contact with the cylinder block 11, the height of the cover-side rib 36 provided in the intermediate part 33M may not be smaller than those of the first flange 34 and the second flange 35. However, the higher the cover-side rib 36 becomes, the higher the rigidity of the intermediate part 33M becomes, thus making it harder for the intermediate part 33M to deform. Therefore, the height of the cover-side rib 36 is set within a range that allows the intermediate part 33M to deform in order to ensure sealing. When other elastic body is used, which is less restricted in its height than the elastic body 15 made of the liquid gasket, the block-side rib 52 is not necessarily required.

As long as the elastic body 15 can be arranged between the distal end 36a of the cover-side rib 36 and the cylinder block 11, the elastic body 15 may be an elastic body other than that made of liquid gasket.

In the foregoing embodiment, as long as the elastic body 15 is able to attenuate vibration of the intermediate part 33M of the first cover member 30, the elastic body provided between the distal end 36a of the cover-side rib 36 and the cylinder block 11 may be in only partially contact with the distal end 36a of the cover-side rib 36. For example, an elastic body, which is in contact only with a distal end of the first rib 361 out of the distal end 36a of the cover-side rib 36, may be arranged between the distal end 36a of the cover-side rib 36 and the cylinder block 11.

As long as vibration of the intermediate part 33M is restrained sufficiently by providing the cover-side rib 36 in the intermediate part 33M, it is not necessary to provide the elastic body 15 between the cover-side rib 36 and the cylinder block 11.

The endless transmission member provided in the housing space may be a member other than the chain 14 as long as the member is able to transmit rotation of the crankshaft 20 to each of the camshafts 21, 22. For example, another endless transmission member may be an endless belt. In this case, the crankshaft 20 and the camshafts 21, 22 are provided with pullies, respectively, instead of the sprockets 20A to 22A.

According to the structure of the foregoing embodiment, it is possible to increase rigidity of the intermediate part in the first cover member by providing the rib, which projects on the cylinder block side, in the intermediate part between the first flange and the second flange. Therefore, when vibration caused by an operation of the engine is transmitted to the first cover member through the first flange and the second flange, it is possible to restrain the intermediate part from vibrating. As a result, it is possible to restrain generation of noise in the internal combustion engine.

When the end surface of the cylinder block on the first cover member side and the end surface of the cylinder head on the first cover member side are misaligned, the deformation of the first cover member absorbs the misalignment of the end surfaces, thereby ensuring sealing between the cylinder block and the first flange and sealing between the cylinder head and the second flange. At this time, if the distal end of the rib is in contact with the cylinder block, a part of the rib in contact with the cylinder block serves as the fulcrum when the first cover member is deformed, thus making it difficult for the first cover member to deform. On the contrary, in the foregoing structure, although the rib is provided in the intermediate part of the first cover member, the distal end of the rib is not in contact with the cylinder block. Therefore, a part of the first flange and the second flange still serves as the fulcrum when the first cover member is deformed. According to the foregoing structure, it is possible to suppress inhibition of deformation of the first cover member due to the rib provided in the intermediate part serving as a fulcrum. Thus, even when the rib is provided in the intermediate part, it is unlikely that a function of ensuring sealing by deforming the first cover member is impaired.

In the foregoing internal combustion engine, it is preferred that the elastic body is provided between the distal end of the rib and the cylinder block. With this structure, the elastic body is able to attenuate vibration of the intermediate part of the first cover member, thereby enhancing an effect of restraining generation of noise caused by vibration of the intermediate part.

Since the elastic body expands and contracts, even when the elastic body is provided between the distal end of the rib and the cylinder block, deformation of the intermediate part caused by misalignment of the end surface of the cylinder head and the end surface of the cylinder block is allowed.

For example, as the foregoing elastic body, it is possible to employ liquid gasket. In a case where the elastic body provided between the distal end of the rib and the cylinder block is liquid gasket as stated above, it is hard to make the elastic body thick. However, when one tries to prevent the elastic body from being thick by increasing the height of the rib of the first cover member, rigidity of the intermediate part of the first cover member becomes too high, making it hard for the first cover member to deform. In this case, it becomes difficult to ensure sealing when the end surface of the cylinder head and the end surface of the cylinder block are misaligned.

Therefore, when a rib provided in the first cover member is the cover-side rib, it is preferred that a block-side rib is provided in the cylinder block, and a distal end of the block-side rib faces the distal end of the cover-side rib. With this structure, by adjusting the height of the block-side rib, it becomes possible to adequately adjust a space between the distal end of the cover-side rib and the cylinder block without making the cover-side rib too high, in other words, without making the rigidity of the intermediate part of the first cover member too high. Therefore, it is possible to adequately arrange the elastic body made of liquid gasket between the distal end of the cover-side rib and the cylinder block (in other words, the distal end of the block-side rib).

Further in the internal combustion engine, as the rib in the confronting wall of the first cover member, ribs having different longitudinal directions may be provided and may be connected with one another. With this structure, compared to the structure in which a single rib extending in one direction is provided, stress received by each of the ribs extending in different directions are dispersed into other ribs, not to mention rigidity is increased in a wider range. Thus, it is possible to restrain vibration of the intermediate part more effectively than the case where a plurality of ribs are provided without being connected with one another.

What is claimed is:
1. An internal combustion engine, comprising:
a first cover member fixed to a cylinder block and a cylinder head;

a second cover member arranged on the opposite side of the cylinder block and the cylinder head from the first cover member;

an endless transmission member that transmits rotation of a crankshaft to a camshaft provided in a space defined by the first cover member and the second cover member;

a first flange, which is provided in a confronting wall of the first cover member and projects on the cylinder block side, in which a distal end of the first flange is in contact with the cylinder block, the confronting wall forming a surface that faces the cylinder block and the cylinder head;

a second flange that is provided at a position separated from the first flange and projects on the cylinder head side, in which a distal end of the second flange is in contact with the cylinder head; and a first rib that is provided in an intermediate part, which is a part of the confronting wall of the first cover member between the first flange and the second flange, and projects on the cylinder block side, in which a distal end of the first rib is not in contact with the cylinder block, wherein a first elastic body is provided on the distal end of the first flange, a second elastic body is provided on the distal end of the second flange, and a third elastic body is provided on the distal end of the first rib, a thickness of the third elastic body being larger than a thickness of the first elastic body and being larger than a thickness of the second elastic body.

2. The internal combustion engine according to claim 1, wherein
the third elastic body is a liquid gasket.

3. The internal combustion engine according to claim 2, further comprising
a second rib that is provided in the cylinder block, in which a distal end of the second rib faces the distal end of the first rib.

4. The internal combustion engine according to claim 3, wherein
a depressed part is provided in a surface of the cylinder block, the surface facing the first cover member, and
the second rib projects from a bottom surface of a part of the cylinder block including, the surface that includes the depressed part, the second rib projecting from the bottom surface towards the first cover.

5. The internal combustion engine according to claim 4, wherein
the third elastic body is provided between the distal end of the first rib and the distal end of the second rib.

6. The internal combustion engine according to claim 1, wherein
the first rib is made of a first rib piece and a second rib piece, and a longitudinal direction of the first rib piece is different from a longitudinal direction of the second rib piece.

7. The internal combustion engine according to claim 6 wherein
the first rib piece and the second rib piece are connected with one another.

* * * * *